United States Patent [19]

Binns

[11] E Patent Number: Re. 32,661

[45] Reissued Date of Patent: May 3, 1988

[54] CLEANING ALUMINUM AT LOW TEMPERATURES

[75] Inventor: Robert E. Binns, Roslyn, Pa.

[73] Assignee: Amchem Products, Inc., Ambler, Pa.

[21] Appl. No.: 634,668

[22] Filed: Jul. 27, 1984

Related U.S. Patent Documents

Reissue of:

[64] Patent No.: 4,009,115
Issued: Feb. 22, 1977
Appl. No.: 607,154
Filed: Aug. 25, 1975

U.S. Applications:

[63] Continuation of Ser. No. 189,741, Sep. 23, 1980, abandoned, and a continuation-in-part of Ser. No. 442,726, Feb. 14, 1974, abandoned.

[51] Int. Cl.[4] ..... C11D 1/72; C11D 7/08; C23C 22/06; C23G 1/12

[52] U.S. Cl. ..... 252/142; 134/3; 134/40; 134/41; 148/6.14 R; 148/6.27; 252/79.3; 252/79.4; 252/146; 252/147

[58] Field of Search ..... 148/6.14 R, 6.27; 156/665; 134/3, 40, 41; 252/79.3, 79.4, 142, 146, 147

[56] References Cited

U.S. PATENT DOCUMENTS

| | | | |
|---|---|---|---|
| Re. 27,662 | 6/1973 | Hamilton . | |
| 2,040,618 | 5/1936 | Mason . | |
| 2,316,220 | 4/1943 | Brown . | |
| 2,376,082 | 5/1945 | Pullen . | |
| 2,413,365 | 12/1946 | McCoy . | |
| 2,477,181 | 7/1949 | Holman . | |
| 2,719,796 | 10/1955 | Kappes . | |
| 2,762,694 | 9/1956 | Newman . | |
| 2,828,193 | 3/1958 | Newman . | |
| 3,138,485 | 6/1964 | Kaveggia . | |
| 3,140,203 | 7/1964 | Grunwald . | |
| 3,220,899 | 11/1965 | Leonard . | |
| 3,275,562 | 9/1966 | Smith . | |
| 3,367,799 | 2/1968 | Beyerle . | |
| 3,448,055 | 6/1969 | Mickelson et al. | 134/3 X |
| 3,510,430 | 5/1970 | Mickelson | 252/79.1 |
| 3,634,262 | 1/1972 | Grunwald et al. . | |
| 3,728,188 | 4/1973 | Yarrington | 156/665 |
| 3,969,135 | 7/1976 | King et al. | 134/41 |

FOREIGN PATENT DOCUMENTS

| | | |
|---|---|---|
| 536710 | 2/1957 | Canada . |
| 850046 | 8/1970 | Canada . |
| 868314 | 4/1971 | Canada . |
| 1202615 | 10/1965 | Fed. Rep. of Germany . |
| 881701 | 5/1943 | France . |
| 543770 | 3/1942 | United Kingdom . |
| 877240 | 9/1961 | United Kingdom . |
| 115630 | 9/1975 | United Kingdom . |

OTHER PUBLICATIONS

Graham, Kenneth A., Editor, *Electroplating Engineering Handbook*, 3rd Ed., Van Nostrand Reinhold Co., N.Y., 1971, p. 169.

Murphy, James A., Editor, *Surface Preparation and Finishes for Metals*, McGraw Hill Book Co., 1971, pp. 24, 25 & 29.

Spring, S., Ph.D.: *Industrial Cleaning*, Prisem Press, Melbourne, (1974), pp. 33 & 34.

Hess et al, "The Surface Treatment at Room Temperature of Al Alloys for Spot Welding", *J. American Welding Soc.*, Sep. 1944, pp. 417s–423s.

Akers et al, "Cleaning Aluminum", *Soap and Sanit. Chem.*, vol. 17, Apr. 1941, pp. 25–27, 71, 73–74.

Wernick et al, *Surface Treatment and Finishing of Aluminum and its Alloys*, 1956, pp. 74, 89, 129, 147.

Harris et al, *Annotated Bibliography of Aluminum Cleaning*, Jan. 1943, (pp. 33–36); Mar. 1943, (pp. 33–38); May 1944, (pp. 35–40).

Harris, Metal Cleaning Bibliographical Abstracts, Publ. No. 90, (1949–pp. 1–68); Publ. No. 90A, (1950, pp. 1–27); Publ. No. 90D, (1957, pp. 1–38).

Mona Industries Inc., "Monaterge LF-945", *Tech. Bulletin No.* 230, Dec. 1975, pp. 1–2.

*Primary Examiner*—Dennis Albrecht
*Attorney, Agent, or Firm*—Alexis Barron

[57] ABSTRACT

Acid cleaning of aluminum surfaces is accomplished employing a composition comprising hydrofluoric acid and sulfuric acid. More specifically, this invention relates to a composition and method for treating aluminum containers at low temperatures.

9 Claims, No Drawings

CLEANING ALUMINUM AT LOW TEMPERATURES

Matter enclosed in heavy brackets [ ] appears in the original patent but forms no part of this reissue specification; matter printed in italics indicates the additions made by reissue.

BACKGROUND OF INVENTION

*This is a continuation of reissue application Ser. No. 189,741, filed Sept. 23, 1980, now abandoned.*

This is a Continuation-In-Part Application of Application Ser. No. 442,726 filed on Feb. 14, 1974 and now abandoned.

Containers comprised of aluminum and alloys thereof are produced in a drawing and forming operation, referred to as drawing and ironing, which results in the deposition of lubricants and forming oils on the surface. In addition, residual aluminum fines, i.e. small particles of aluminum, are deposited on the interior and exterior surfaces of the container during the forming operation. Ordinarily, the exterior surface of the container will have smaller quantities of aluminum fines since during the drawing and ironing step the exterior surface is not subject to as much abrasion from the die as the interior surface.

Prior to any processing steps, such as conversion coating and sanitary lacquer deposition, the surfaces of the aluminum containers must be clean and water-break-free so that there are no contaminants which prevent further processing and which render the containers unacceptable for use.

Acid cleaners have been employed to clean the aluminum surfaces and to remove aluminum fines deposited on the interior walls of aluminum containers. Acid cleaning is ordinarily accomplished at temperatures from 185° F. to 200° F. in order to remove or dissolve the aluminum fines and to remove the lubricants and forming oils so that the surface is rendered water-break-free. The cleanliness of the aluminum surface is measured by the ability of the interior and exterior surfaces of the formed aluminum container to support a continuous break-free film of water, that is to be water-break-free.

Due to the high temperatures at which cleaning is accomplished, that is from 185° F. to 200° F., and the acidity of the cleaning composition, the processing equipment employed to heat the cleaning composition, particularly the fire tubes of gas fired heat exchangers, are susceptible to corrosion. Furthermore, the high temperatures increase operating costs and fuel consumption.

Chromic acid or salts thereof have been utilized to minimize the corrosion of the processing equipment by inhibiting the corrosive attack of the acid cleaning composition on the processing equipment. An important shortcoming which cleaners of this kind possess is the inherent toxicity of the hexavalent and trivalent chromium compounds contained therein and the resultant waste disposal problem created by the presence of chromium in the cleaner effluent.

Attempts have been made to include other additives in the cleaning compositions to provide efficient cleaning. Such additives have included fluoride. Maintenance and control of acidic cleaners at low pH's has proven impractical, especially when fluorides are present. Furthermore, as such cleaning is effected at high temperatures, the fluoride when present in high concentrations can attack the metal surface and etch the surface which is undesirable, especially when cleaning of containers is to be effected.

The principal object of this invention is to provide a cleaning composition for aluminum for removing and dissolving aluminum fines and for cleaning lubricating oils from the aluminum surface.

An object of this invention is to provide a process for cleaning aluminum surfaces at low temperatures thereby reducing corrosion and attack of processing equipment and reducing heating costs and heating fuel consumption.

An added object of this invention is to provide a cleaning composition possessing good cleaning ability and preventing corrosive attack of processing equipment while having no chromate therein.

Another object is to provide a cleaning solution which produces no sludge during operation.

A concomitant object of this invention is to provide a cleaning solution having relatively low concentrations of hydrofluoric acid, which can be easily controlled and which enables the cleaning of aluminum surfaces with little or no etching of the surface.

DETAILED DESCRIPTION OF THE INVENTION

I have discovered a composition and process for the cleaning of aluminum surfaces, said composition comprising from about 0.005 to about 0.1 grams/liter of hydrofluoric acid and from about 1 to about 10 grams/liter of sulfuric acid. When an aqueous cleaning composition comprising hydrofluoric acid and sulfuric acid is employed at the concentrations specified above, the aluminum surface is cleaned of lubricant and metallic fines at temperatures as low as from about 90° F. to about 135° F.

It should be understood that the term aluminum surface used herein includes aluminum and aluminum alloys in which aluminum is the principal constituent. It should be understood that by "cleaning composition," or "cleaning solution" I mean the aqueous acidic cleaning bath of the present invention comprising hydrofluoric acid and sulfuric acid.

The surprising results obtained with the use of the cleaning solution include the removal and dissolution of aluminum fines from a formed aluminum container, both on the interior walls and dome of said container, at temperatures within the range of from about 90° F. to about 135° F. In addition, it has been found that with the use of the cleaning solution of the present invention corrosive attack of the processing equipment, particularly the fire tubes of gas fired heat exchangers, is reduced considerably. This is accomplished without the use of any inhibitors in the cleaning solution, such as hexavalent chromium.

I have found that active fluoride is a necessary constituent which is responsible for assisting in dissolution of the aluminum fines and oil film removal. In the present cleaning process it is essential that the active fluoride be maintained within specified limits, since the active fluoride affects the aluminum fine dissolution and oil film removal.

The term "active fluoride" means the fluoride present in the operating cleaning solution and measurable at a given pH by a fluoride sensitive electrode of the potentiometric type. For example, electrodes of this type and their use are described in U.S. Pat. No. 3,431,182 which is hereby incorporated by reference. The electrodes described therein are known to the art as fluoride specific ion electrodes.

Due to the low concentration of hydrofluoric acid in the cleaning solution of this invention, a potentiometric type electrode is found to be preferable for measuring active fluoride. Other measuring devices that are not of the potentiometric type are insensitive to the concentration of hydrofluoric acid in the cleaning solutions of the present invention, as they are useful only in concentrated solutions or solutions having higher concentrations of hydrofluoric acid.

With the use of the potentiometric type electrode, the active fluoride measurement is measured as a potential which is proportional to or related to the actual fluoride ion concentration in the solution.

It is known that in acid solutions containing fluoride, hydrogen ion complexes a portion of the fluoride forming undissociated HF and $HF_2^-$. In addition, when aluminum is dissolved in such solutions, $Al^{+3}$ also complexes fluoride. Due to the presence of these complexing agents, it is difficult to measure actual free fluoride ion concentration without extensive sample manipulation. However, by the use of the potentiometric type electrode, once a reference point has been arrived at by measuring a make-up cleaning solution potential and taking this potential as the zero point, it is inconsequential how much fluoride is actually complexed. The potential increases negatively in more concentrated solutions, that is when the active fluoride concentration increases, and the potential increases positively in more dilute solutions, that is when the active fluoride concentration decreases. When aluminum ions enter the solution as aluminum fines are removed from the surface, the electrode potential becomes more positive as the amount of active fluoride decreases. When additions of hydrofluoric acid are effected, the potential becomes less positive and approaches the zero point again. Since the potentiometric type electrode will measure the active fluoride in the solution, taking no account of any complexed fluoride, additions of active fluoride, preferably as hydrofluoric acid, can be made to the operating cleaning solution to return the potential measurement to the original zero reference point.

It has been discovered that as a cleaning solution is used, aluminum is dissolved off the surface being treated at a specific rate. In general, cleaning solutions of the present invention will have operating characteristics such that at make-up the aluminum dissolution rate is from about 8 to about 25 milligrams per square foot (0.009 to 0.027 mg/cm$^2$) of aluminum surface treated. It has been observed that best results, with minimal etch of the surface, are obtained when the aluminum dissolution rate is from 9 to 20 milligrams per square foot (0.01 to 0.022 mg/cm$^2$) of aluminum surface treated. This dissolution rate occurs at make-up of a cleaning solution having from about 0.005 to about 0.1 grams/liter of hydrofluoric acid. By establishing a zero potential point with a potentiometric type electrode at make-up of the cleaning solution, and by recording the potential measurements as metal surfaces are processed and cleaned, the aluminum dissolution rate is maintained within the preferred range by additions of active fluoride, preferably as hydrofluoric acid. So, the potentiometer electrode is used as a guideline for determining when to adjust the amounts of active fluoride in solution, and also to maintain sufficient active fluoride therein to effect a desirable aluminum dissolution rate.

The active fluoride suitable for use herein is preferably added to the cleaning composition as hydrofluoric acid. A simple fluoride salt can also be utilized, for example, an alkali metal fluoride or bifluoride such as sodium fluoride, ammonium fluoride or bifluoride. Complex fluoride can be employed. However, greater concentrations of complex fluoride will be necessary to yield desirable amounts of active fluoride, as the hydrolysis of complex fluorides is not as substantial as with the simple fluoride, to liberate the required active fluoride.

The amount of active fluoride in the cleaning solution is expressed herein as a concentration of hydrofluoric acid. This means that the active fluoride is in the form of dissociated fluoride whose concentration is expressed as the concentration of hydrofluoric acid.

The active fluoride in the cleaning solution aids in the removal of aluminum fines on the metal substrate which have formed during the forming operation. A surprising aspect of this invention is that the cleaning process can be effected when the amount of hydrofluoric acid present in the solution, is as low as 0.005 grams/liter. I have found that by employing the preferred amount of hydrofluoric acid, resulting in the presence of sufficient active fluoride, removal of the aluminum fines is accomplished without vigorous attack of the underlying aluminum surface. Of course, should the active fluoride be depleted in the cleaning solution, preferably it can be replenished by addition of hydrofluoric acid.

Sulfuric acid in the cleaning solution should be present in an amount of from about 1 to about 10 grams/liter. It is preferred that the sulfuric acid be present in an amount from about 3 to about 5 grams/liter.

The hydrofluoric acid should be present in the cleaning solution in an amount from about 0.005 to about 0.1 grams/liter. For optimum results, it is preferred that the hydrofluoric acid be present in an amount from about 0.01 to about 0.03 grams/liter.

In the preferred embodiment of this invention an operating cleaning solution is employed comprising hydrofluoric acid and sulfuric acid wherein the concentration of constituents, at the beginning of operation as well as upon replenishment, is maintained such that the sulfuric acid is present in amount from about 3 to about 5 grams/liter, and the active fluoride is maintained at the level measured at make-up, that is when the hydrofluoric acid concentration at make-up is about 0.01 to about 0.03 grams/liter. When a cleaning solution is operated and maintained within these preferred limits it has been found that excellent cleaning of the aluminum surface will result. A most surprising result is that the surface will be free of oils and aluminum fines without the corrosive attack of processing equipment occurring.

The cleaning solution preferably is prepared by employing aqueous concentrates consisting of sulfuric acid and water, and hydrofluoric acid and water. The aqueous concentrates can be added to an appropriate amount of water to prepare a working cleaning solution having constituent concentrations within the operative ranges set forth herein. Alternatively, the hydrofluoric acid and sulfuric acid can be prepared as a concentrate and can be added simultaneously as one component to water to form the aqueous cleaning composition at concentrations for use.

Surfactants are desirably included in the cleaning composition. Such materials enhance the cleaning performance considerably. It has been observed that the use of surfactants in the cleaning solution assist in more rapid wetting of the surface and the removal of lubricant and oils. The surface active agents to be employed herein can be anionic, cationic, or nonionic. Preferably nonionic or anionic surface active agents are used. Examples of surface active agents that can be utilized are Tergitol 08 (sodium 2-ethyl hexyl sulfate), Triton DF-16 (a modified polyethoxylated straight chain alcohol), Polytergent S-505 LF (a modified polyethoxylated straight chain alcohol), Surfonic LF-17 (an alkyl polyethoxylated ether), Plurafac RA-30 (a modified oxyethylated straight chain alcohol), Triton X-102 (an octylphenoxy polyethoxy ethanol), Plurafac D-25 (modified oxyethylated straight chain alcohol) and Antarox BL 330 (a modified polyethoxylated straight chain alcohol). The surface active agent present in the cleaning composition can be a combination of one or more particular surface active agents. The surface active agent can be present in the cleaning composition in an amount from about 0.1 to about 10 grams/liter.

Cleaning compositions having the following formulas can be employed:

| | Grams |
|---|---|
| FORMULA I | |
| Hydrofluoric Acid | 0.02 |
| Sulfuric Acid | 4.0 |
| Anionic Surfactant (Tergitol 08) | 1.0 |
| Water to make 1 liter | |
| FORMULA II | |
| Hydrofluoric Acid | .005 |
| Sulfuric Acid | 6.0 |
| Nonionic surfactant (Triton DF 16) | 1.0 |
| Water to make 1 liter | |
| FORMULA III | |
| Hydrofluoric Acid | .01 |
| Sulfuric Acid | 4.0 |
| Nonionic Surfactant (Plurofac RA 30) | 2.0 |
| Water to make 1 liter | |

The metal surface should be cleaned employing techniques that result in a completely water-break-free surface. The cleaning solution can be applied to the aluminum surface utilizing any of the contacting techniques known to the art. Preferably, application will be effected by conventional spray or immersion methods. The time of treatment of the surface with the cleaning solution need only be long enough to insure complete wetting of the surface and can be as long as 10 minutes. Preferably, the surface should be treated for a time from about 15 seconds to about 2 minutes.

The aluminum fines and forming oils are removed from the aluminum surface by the cleaning solution at temperatures lower than ordinarily expected. The cleaning process can be operated at temperatures from about 90° F. to about 135° F. It is preferred that the cleaning process be operated at temperatures from about 110° F. to about 125° F. Optimum results are obtained when the cleaning process is operated at temperatures from about 120° F. to about 125° F. This is a distinct advantage of the present invention over prior art processes, as the low operating temperatures with good cleaning results prevents accelerated corrosion and attack of processing equipment.

In accordance with the invention the cleaning solution is highly acidic, having a pH below 2.0. The amount of sulfuric acid and hydrofluoric acid can be varied within limits in accordance with the ranges set forth hereinabove so that the pH of the cleaning solution can be adjusted. Preferably the pH of the cleaning solution is adjusted to from about 1.0 to about 1.8, and optimum results, that is excellent cleaning with minimal etching, are obtained when the pH of the cleaning solution is adjusted to from about 1.2 to about 1.5.

In accordance with broader aspects of the invention, there is considerable flexibility available with respect to portions of the overall processing of the aluminum substrate. In particular, chemical processing steps can be effected prior to cleaning such as, for example, a hot water prerinse of the surface. Following application of the cleaning solution, the surface can be rinsed with water and then dried. Ordinarily a water rinse is necessary to remove any remaining residues which may have remained after the cleaning step. After the rinse step, the aluminum surface may be contacted with conversion coating solutions or siccative finish coating compositions well known to the art. Generally, the coating solution will be applied directly after the cleaning operation or a short period of time thereafter. However, as specified hereinabove, the cleaned surface can be dried and the coating steps may be accomplished at a later time.

The following examples are illustrative of this invention and are not considered as limiting for other materials and operating conditions falling within the scope of this invention which might be substituted.

EXAMPLE I

Aluminum container test specimens of 3004 alloy, drawn into single piece containers, were employed in this procedure. The containers had been subjected to a drawing operation and were covered with aluminum fines and drawing oils.

The test specimens were treated as follows:

1. Treated for 60 seconds by spraying the interior and exterior of the specimens with the solutions listed in Table 1.

2. Rinsed with water by immersion in cold water for 30 seconds at ambient temperature.

Control specimens were treated with aqueous compositions comprising acids, as indicated in Table 1, such as sulfuric, hydrochloric, phosphoric, and nitric acid, as well as specified combinations or mixtures of these acids. The concentrations of the aqueous solutions and the constituents therein are listed in Table 1. The temperature of each of the respective solutions when employed to treat the test and control specimens is listed in Table 1.

Except when an anionic surfactant (Tergitol 08) was employed in the solutions as indicated in Table 1, all other compositions contained 0.1 grams/liter of a nonionic surfactant (0.1 gram/liter of Triton X-102).

The aluminum surfaces were tested for water-break following cleaning. The container surfaces were treated by measuring the percent of water-break on the surface, that is the percent of the total surface area which did not support a continuous film of water. The results are listed in Table 1.

The results reported in Table 1 include a determination of the presence of aluminum fines remaining on the surface after processing was completed. The brightness and appearance of the test specimens at the end of the processing procedure was also observed. The brightness quality was determined by visually rating the degree of brightness of the surface from 1 to 5 wherein the brightness rating of 1 represents best performance and appearance and rating of 5 represents poor appearance. The presence of aluminum fines on the interior surface was determined by rubbing the surface with a clean white cloth and observing the fines deposited on the cloth. The presence of fines is evidenced by a dark black residue on the white cloth. The amount of fines present is expressed in Table 1 in gradations from excellent (E) for no residue, good (G) for very light residue, fair (F) for moderate residue, to poor (P) for very heavy residue.

TABLE 1

| | Temperature | Percent Waterbreak Exterior | Percent Waterbreak Interior | Interior Wipe | Interior Appearance |
|---|---|---|---|---|---|
| Aqueous Composition | | | | | |
| 2 g/l $H_2SO_4$ | 150° F. | 80 | 80 | G | 4 |
| 4 g/l $H_2SO_4$ | 150° F. | 60 | 30 | F | 4 |
| 6 g/l $H_2SO_4$ | 150° F. | 50 | 10 | P | 4 |
| 2 g/l HCl | 150° F. | 100 | 90 | G | 4 |
| 4 g/l HCl | 150° F. | 100 | 80 | G | 4 |
| 6 g/l HCl | 150° F. | 100 | 80 | G | 4 |
| 2 g/l $H_3PO_4$ | 150° F. | 90 | 80 | G | 4 |
| 4 g/l $H_3PO_4$ | 150° F. | 50 | 80 | E | 4 |
| 6 g/l $H_3PO_4$ | 150° F. | 70 | 50 | E | 3 |
| 2 g/l $HNO_3$ | 150° F. | 100 | 100 | E | 5 |
| 4 g/l $HNO_3$ | 150° F. | 100 | 90 | E | 5 |
| 6 g/l $HNO_3$ | 150° F. | 100 | 90 | G | 5 |
| 2 g/l $H_2SO_4$ + 2 g/l HCl | 150° F. | 90 | 30 | P | 3 |
| 3 g/l $H_2SO_4$ + 3 g/l HCl | 150° F. | 80 | 30 | P | 3 |
| Bath Composition | | | | | |
| 2 g/l $H_2SO_4$ + 2 g/l $H_3PO_4$ | 150° F. | 70 | 5 | F | 2 |
| 3 g/l $H_2SO_4$ + 3 g/l $H_3PO_4$ | 150° F. | 70 | 5 | G | 2 |
| 2 g/l $H_2SO_4$ + 2 g/l $HNO_3$ | 150° F. | 90 | 30 | P | 3 |
| 3 g/l $H_2SO_4$ + 3 g/l $HNO_3$ | 150° F. | 90 | 5 | P | 3 |
| 2 g/l $H_2SO_4$ + 2 g/l $H_3PO_4$ | 120° F. | 100 | 10 | P | 4 |
| 3 g/l $H_2SO_4$ + 3 g/l $H_3PO_4$ | 120° F. | 100 | 10 | P | 4 |
| 4 g/l $H_2SO_4$ + 0.01 g/l $NH_4HF_2$ | 120° F. | 80 | 50 | P | 4 |
| 4 g/l $H_2SO_4$ + 0.02 g/l $NH_4HF_2$ | 120° F. | 50 | 10 | P | 4 |
| 4 g/l $H_2SO_4$ + 0.04 g/l $NH_4HF_2$ | 120° F. | 20 | 0 | G | 2 |
| 4 g/l $H_2SO_4$ + 0.05 g/l $NH_4HF_2$ | 120° F. | 10 | 0 | E | 1 |
| 4 g/l $H_2SO_4$ + 1 g/l anionic surfactant + .02 g/l HF | 120° F. | 0 | 0 | E | 1 |
| 10.0 g/l $H_2SO_4$ + 1.0 g/l anionic surfactant + 0.005 g/l HF | 135° F. | 0 | 0 | G | 2 |
| 1.0 g/l $H_2SO_4$ + 1.0 g/l anionic surfactant + 0.10 g/l HF | 110° F. | 0 | 0 | E | 1 |

EXAMPLE II

An aqueous acidic cleaning bath was prepared by adding 4.0 grams of sulfuric acid, 0.02 grams of hydrofluoric acid, and 1.0 gram of an anionic surfactant (Tergitol 08) to each one liter of water. The temperature of the bath was elevated to and maintained at 120° F. A fluoride specific ion electrode and a saturated calomel reference electrode were coupled to a potentiometric meter capable of discerning changes in electrode potential of ±1.0 millivolt. The electrodes were immersed into the bath and the meter adjusted, by the zero offset control, to read on the center of the scale.

Aluminum containers of 3004 alloy drawn into single piece containers were sprayed with the prepared bath and the meter readings became more positive. When the electrode potential reached +3 millivolts from center scale, hydrofluoric acid additions were made to restore the electrode potential to center scale. Electro metric pH measurements, and sulfuric acid additions were made to maintain the pH at 1.3 to 1.5.

The containers were observed to be water-break-free and bright in appearance.

EXAMPLE III

An aqueous acidic cleaning bath was prepared by adding 4.0 grams of sulfuric acid, 0.02 grams of hydrofluoric acid, and 1.0 gram of a nonionic surfactant (Triton DF-16) to each one liter of water. The temperature of the bath was elevated to and maintained at 120° F. A fluoride specific ion electrode and a saturated calomel reference electrode were coupled to a potentiometric meter capable of discerning changes in electrode potential of ±1.0 millivolt. The electrodes were immersed into the bath and the meter adjusted, the the zero offset control, to read on the center of the scale.

Aluminum containers of 3004 alloy drawn into single piece containers were sprayed with the prepared bath and the meter readings became more positive. When the electrode potential reached +5 millivolts from center scale, hydrofluoric acid additions were made to restore the electrode potential to center scale. Electro metric pH measurements, and sulfuric acid additions were made to maintain the pH at about 1.2.

The containers were observed to be water-break-free and bright in appearance.

I claim:

[1. An aqueous cleaning composition for removing and dissolving aluminum fines and cleaning lubricating oils from aluminum surfaces comprising of from about 1 to about 10 grams/liter of sulfuric acid and from about 0.005 to about 0.1 grams/liter of hydrofluoric acid.]

[2. The composition of claim 1, wherein the pH is from about 1.0 to about 1.8.]

[3. The composition of claim 1, further comprising a surfactant in an amount from about 0.1 to about 10 grams/liter.]

[4. The composition of claim 3, wherein the surfactant is selected from the group consisting of nonionic and anionic surfactants.]

[5. The composition of claim 4, wherein the surfactant is selected from the group consisting of sodium 2-ethyl hexyl sulfate and an alkyl polyethoxylated ether.]

[6. An aqueous cleaning composition for removing and dissolving aluminum fines and cleaning lubricating oils from aluminum surfaces consisting essentially of about 3 to about 5 grams/liter of sulfuric acid, from about 0.01 to about 0.03 grams/liter of hydrofluoric acid, and from about 0.1 to about 10 grams/liter of an alkyl polyethoxylated ether nonionic surfactant.]

*7. An acidic aqueous cleaning solution having a pH of less than 2.0 and consisting essentially of about 1 to about 10 g/l of sulfuric acid, about 0.005 to about 0.1 g/l of hydrofluoric acid, and about 0.1 to about 10 g/l of a surfactant selected from the group consisting of nonionic and anionic surfactants, wherein the sources of said acids are respectively sulfuric acid and hydrofluoric acid, wherein said solution is free of a corrosion inhibitor in a corrosion-inhibiting amount and of a sludge-forming material, and wherein said solution is effective in removing and dissolving aluminum fines and in cleaning lubricating oils from the surfaces of drawn and ironed aluminum cans of 3004 alloy at a temperature within the range of about 110° F. to about 135° F., said cleaned surfaces being water-break-free.*

*8. A cleaning solution according to claim 7 wherein the concentration of said sulfuric acid is about 3 to about 5 g/l.*

*9. A cleaning solution according to claim 7 wherein the concentration of said hydrofluoric acid is about 0.01 to about 0.03 g/l.*

*10. A cleaning solution according to claim 7 wherein the concentrations of said sulfuric and said hydrofluoric acid are respectively about 3 to about 5 g/l and about 0.01 to about 0.03 g/l.*

*11. A cleaning solution according to claim 7, 8, 9 or 10 wherein said pH is about 1.0 to about 1.8.*

*12. A cleaning solution according to claim 7, 8, 9 or 10 wherein said pH is about 1.2 to about 1.5.*

*13. A cleaning solution according to claim 7, 8, 9 or 10 wherein said surfactant is a nonionic surfactant.*

*14. A cleaning solution according to claim 13 wherein said pH is about 1.0 to about 1.8.*

*15. A cleaning solution according to claim 13 wherein said pH is about 1.2 to about 1.5.*

• • • • •